US006513951B1

(12) United States Patent
Wang et al.

(10) Patent No.: US 6,513,951 B1
(45) Date of Patent: Feb. 4, 2003

(54) PORTABLE APPARATUS FOR USE WITH A LIGHT-EMITTING DISK

(75) Inventors: Shaw-Jong Wang, Hsinchu (TW); Chien-Hua Wu, Miao Li Hsien (TW); Chih-Ping Liang, Hsinchu Hsien (TW)

(73) Assignee: Ritek Corporation, Hsinchu Hsien (TW)

( * ) Notice: Subject to any disclaimer, the term of this patent is extended or adjusted under 35 U.S.C. 154(b) by 0 days.

(21) Appl. No.: 09/905,009

(22) Filed: Jul. 13, 2001

(51) Int. Cl.[7] .................................................. B32B 3/02

(52) U.S. Cl. ......................... 362/253; 362/118; 362/35; 362/84; 362/109; 362/269

(58) Field of Search ............................ 362/35, 84, 269, 362/272, 118, 109, 87, 89; 40/542, 544

(56) References Cited

U.S. PATENT DOCUMENTS 4,338,547 A * 7/1982 McCaslin ................... 315/312
6,082,868 A * 7/2000 Carpenter .................... 362/96
6,280,809 B1 * 8/2001 Wang et al. ................ 345/156
6,347,877 B1 * 2/2002 Douglass, II ............... 362/147
6,380,387 B1 * 4/2002 Yanazaki .................... 315/169

* cited by examiner

*Primary Examiner*—Sandra O'Shea
*Assistant Examiner*—Anabel Ton
(74) *Attorney, Agent, or Firm*—Senniger, Powers, Leavitt & Roedel

(57) ABSTRACT

The present invention relates to a portable apparatus including a fastening mechanism for use with the light-emitting disk. The clamping area of the light-emitting disk has a plurality of conductive terminals, and the touch portion of the fastening mechanism connected with the conductive terminals can supply electrical power to light up the light-emitting disk. Furthermore, the light-emitting disk can light partially, intermittently or colorfully by itself because the fastening mechanism controls the electrical power in different modes.

15 Claims, 10 Drawing Sheets

PORTABLE APPARATUS FOR USE WITH A LIGHT-EMITTING DISK

CROSS-REFERENCE TO RELATED APPLICATIONS

U.S. application Ser. No. 09/399,326 by one primary inventor of the present invention, entitled "Disk with Light Emitting," discloses a light-emitting disk containing a compact disk portion and an electroluminescent (EL) portion. The compact disk portion includes a substrate on which digital data is recorded. The EL portion can luminesce by applying external electricity. The compact disk can be a CD-ROM, CD-R, CD-RW, DVD-R0M, DVD-RW, MD, etc., and the EL portion can be manufactured by EL, OLED or PLED.

U.S. application Ser. No. 09/805,033 by one primary inventor of the present invention, entitled "Dimmer Light Utilizing a Light-Emitting Disk", discloses a dimmer light including a light-emitting disk and a socket. The light-emitting disk includes a readable surface and a light-emitting surface provided with a plurality of conductive terminals. The socket, including a body and a plug, and a lengthwise slot, is placed on the top surface of the body for receiving the light-emitting disk, and a plurality of solder bumps are placed in the slot for the electrical connection to the plug. When the light-emitting disk is inserted into the slot, the plurality of conductive terminals and solder bumps are electrically conductive to excite the light-emitting disk to luminesce. However, the above dimmer light, utilizing a light-emitting disk, can only be used at a fixed place and lacks a mobile function. Therefore, how to design a personal and mobile light-emitting disk, adding additional business value, is an important issue.

BACKGROUND OF THE INVENTION

1. Field of the Invention

The present invention relates to a portable apparatus for use with a light-emitting disk, and particularly to a portable apparatus for use with the light-emitting disk placing conductive terminals on the clamping area.

2. Description of Related Art

Compact disks have been extensively used as a medium for recording audio, video and digital data. Usually, a readable surface containing data read by laser is on one side of the compact disk, and a transparent protective layer is used to cover the readable surface. In addition, patterns are printed on the other side of the compact disk for marking the content of the compact disk and enriching the appearance of the compact disk. As the medium for advertisement progresses, purely planar printing gradually draws less attention of people and loses its appeal.

SUMMARY OF THE INVENTION

The main object of the present invention is to propose a portable apparatus for use with the light-emitting disk. The light-emitting disk can be held by users with a fastening mechanism, hanged on the chest of a user or placed on a table, etc.

The second object of the present invention is to increase functions of the light-emitting disk by emitting light from a part of the disk, an intermittent light, lights of different colors or designing a special model for increasing the pleasure and purchasing desire of the user/consumers.

The third object of the present invention is to increase business functions of the light-emitting disk. The sponsor of a party, a signing show or a pub can previously record the singer's song on a light-emitting disk, combine the light-emitting disk into a portable apparatus by the teaching of the present invention, and give as a present to viewers or draw lots to determine the prize winners for increasing a scene atmosphere or for advertising effect.

The present invention comprises a light-emitting disk and a fastening mechanism. The light-emitting disk includes a readable surface and a light-emitting surface, and a plurality of conductive terminals are placed on a clamping area of the light-emitting surface. The fastening mechanism includes an extending portion, a touch portion and a power source. The extending portion is used for passing through a central hole of the light-emitting disk, and the touch portion is connected to the extending portion and used for transferring the power source to the conductive terminals to excite the light-emitting disk to luminesce.

BRIEF DESCRIPTION OF THE DRAWINGS

FIG. 5(*c*) shows a possible usage of the portable apparatus for use with the light-emitting disk shown in FIGS. 5(*a*) and 5(*b*);

PREFERRED EMBODIMENT OF THE PRESENT INVENTION

Figure 1A:
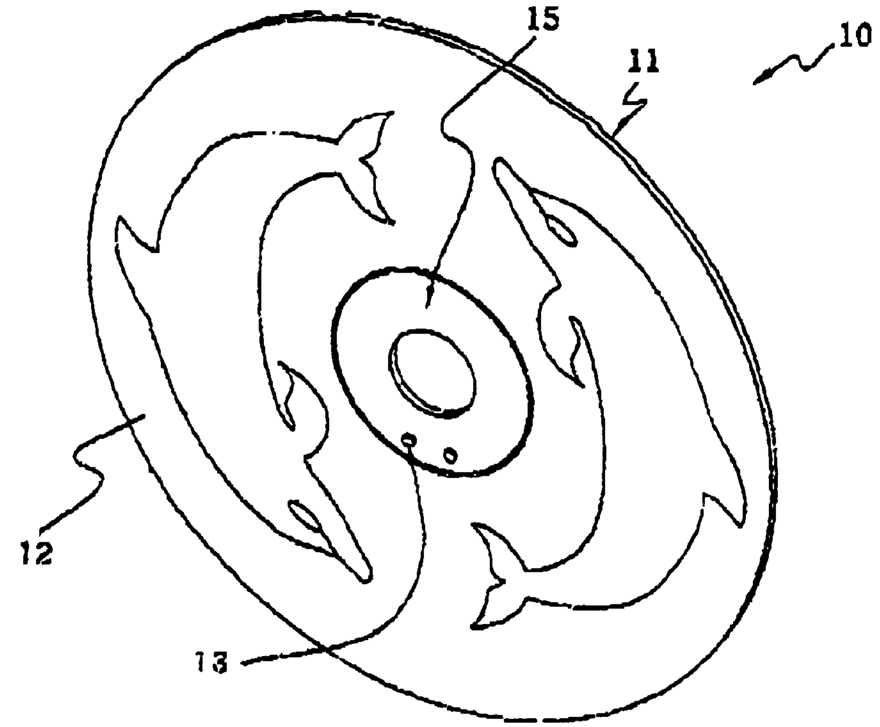
FIGS. 1(*a*) and 1(*b*) shown light-emitting disks according to embodiments of the present invention.
Figure 1B:
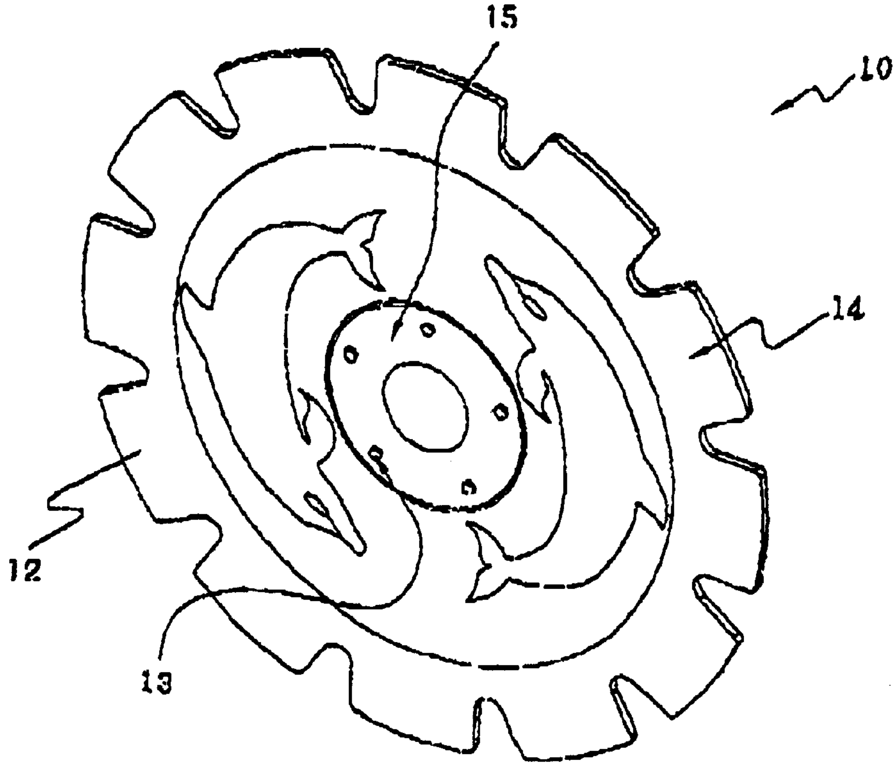

FIGS. 1(*a*) and 1(*b*) show light-emitting disks 10 according to an embodiment of the present invention. The light-emitting disk disclosed in the U.S. patent application Ser. No. 09/399,326 mentioned above is only an embodiment invented by the inventor. The present invention does not limit the process or structure of the light-emitting disk 10, and all the light-emitting disks 10 whose one side (readable surface 11) is used to record data and another side (light-emitting surface 12) is used for illumination by applying external electricity are suitable to the present invention. Besides, the readable surface 11 of the light-emitting disk 10 still has the recording capability, such as prior CD-ROM, CD-R, CD-RW, DVD-ROM, DVD-R, DVD-RW, MD, etc., and the light-emitting disk 10 still has various shapes, such as a shape of a heart and ellipse or other irregular shapes.

The light-emitting surface 12 can emit light partially, intermittently and with various colors, and can be made by EL, OLED, PLED, etc. The shape of the light-emitting disk 10 in FIG. 1(*a*) is circular, and two conductive terminals 13 are placed on the clamping area 15 of the light-emitting surface 12. When external electricity is applied to these two conductive terminals 13, the light-emitting surface 12 will be excited to luminesce. The light-emitting surface 12 acts as a light source; a front sheet with a special pattern (such as dolphins in the embodiments) can be directly adhered on the light-emitting surface 12, and only lights on these regions. The light-emitting disk 10 in FIG. 1(*b*) has a rim having a plurality of protruded regions 14, and a plurality of conductive terminals 13 are placed on the clamping area 15 of the light-emitting surface 12. One of the conductive terminals 13 can serve as a voltage reference point, and other conductive terminals 13 are used to turn on or turn off the illumination of corresponding protruded regions 14. External electricity can be applied to the plurality of conductive terminals 13 and voltage reference point for lighting the light-emitting surface 12 partially, intermittently or with various colors.

Figure 2A:
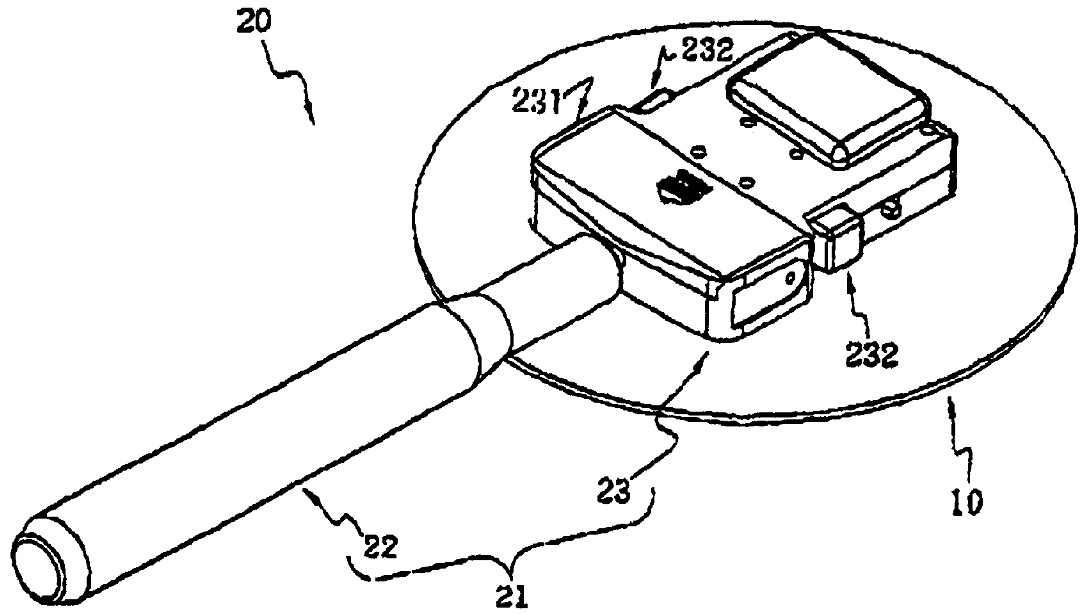
FIGS. 2(*a*) and 2(*b*) show front view and back view of a first embodiment of the portable apparatus for use with the light-emitting disk according to the present invention.
Figure 2B:
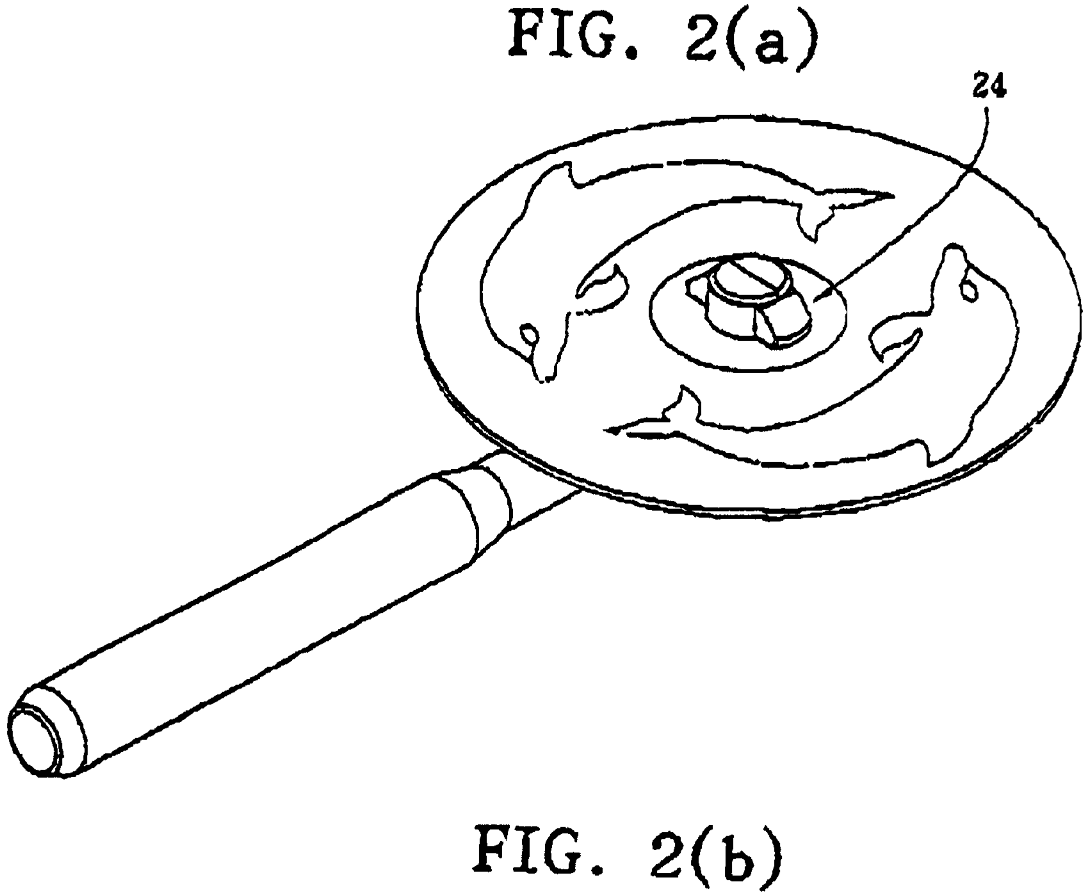

FIGS. 2(*a*) and 2(*b*) show a front view and a back view of a first embodiment of the portable apparatus for use with the light-emitting disk according to the present invention. The portable apparatus 20 for use with the light-emitting disk mainly comprises a fastening mechanism 21 and a light-emitting disk 10, and the fastening mechanism 21 includes a hand-carrying portion 22, an extending portion 23 and a touch portion 24. The extending portion 23 extends from the top of the hand-carrying portion 22, and includes a battery box for embedding a battery to provide power source for the portable apparatus 20. In this embodiment, the touch portion 24 is a pair of separate metal blocks, which is used to transport the power source of the battery into the plurality of conductive terminals 13 of the light-emitting disk 10 and combine the fastening mechanism 21 and the light-emitting disk 10 tightly.

Figure 3A:
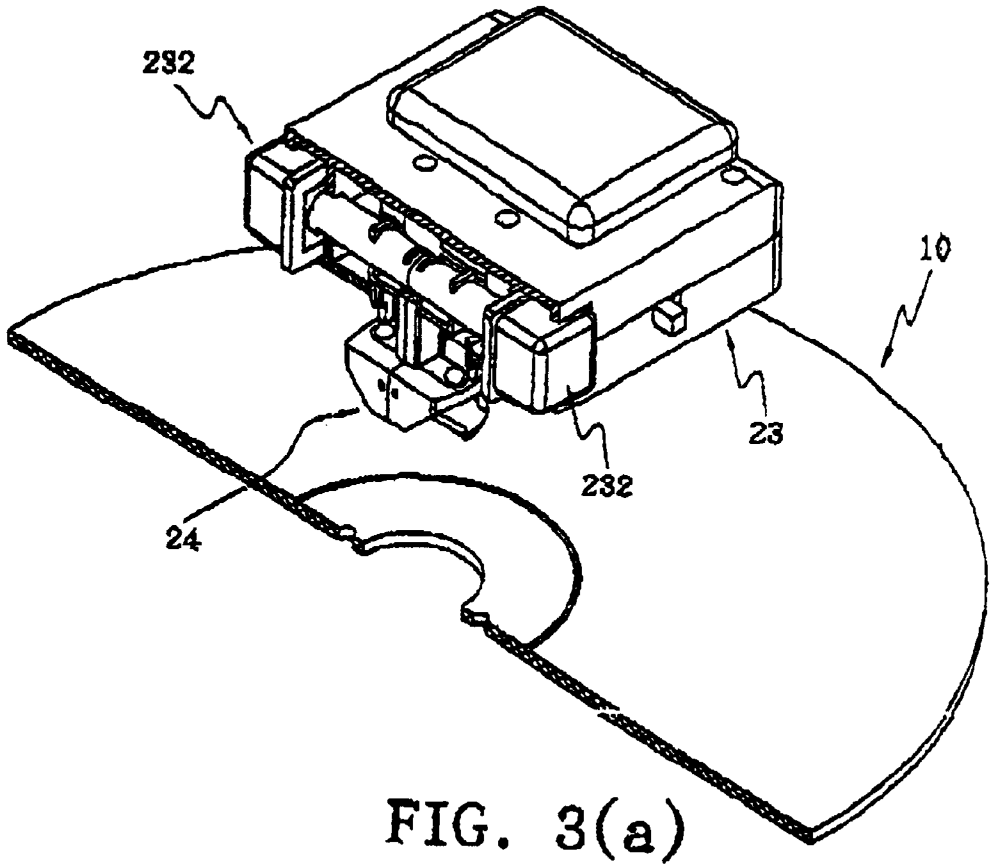
FIGS. 3(*a*) and 3(*b*) show a cross-sectional view of the extending portion and touch portion of the present invention.
Figure 3B:
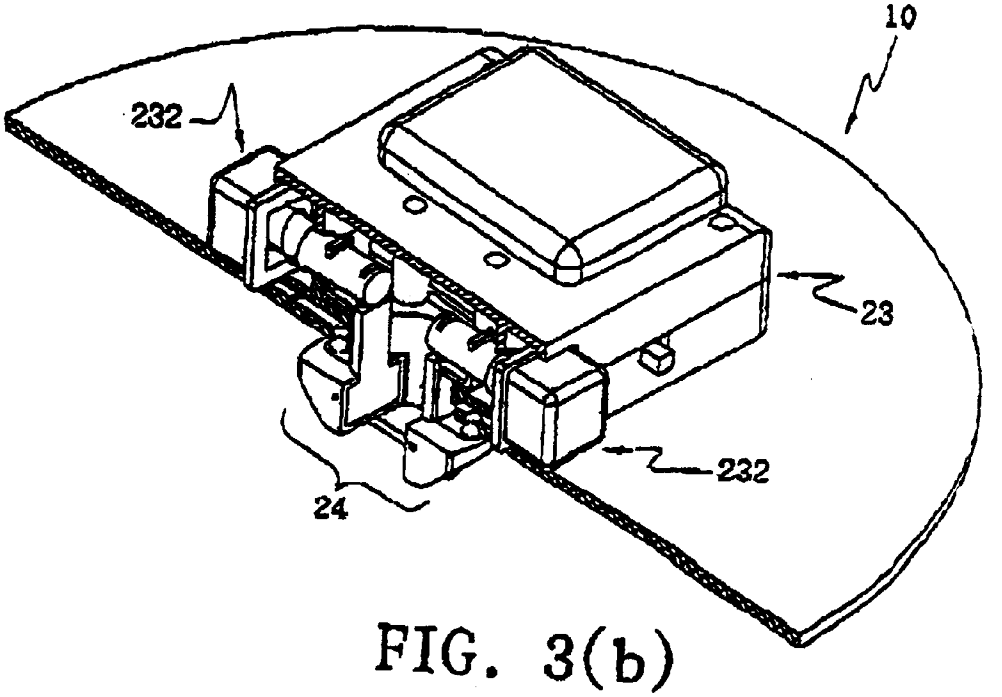

FIGS. 3(*a*) and 3(*b*) show a cross-sectional view of the extending portion 23 and touch portion 24 of the present invention. After a user pushes buttons 232 in the extending portion 23, the touch portion (the pair of metal blocks) 24 shrinks inwards for passing through the central hole of the light-emitting disk 10. When the buttons 232 are released, the touch portion 24 returns to its original positions, and the fastening mechanism 21 and the light-emitting disk 10 are combined tightly. In FIG. 3(*b*), the touch portion 24 will contact conductive terminals 13 of the light-emitting disk 10 when returning to its original positions to obtain the purpose of electrical connection.

Figure 4:
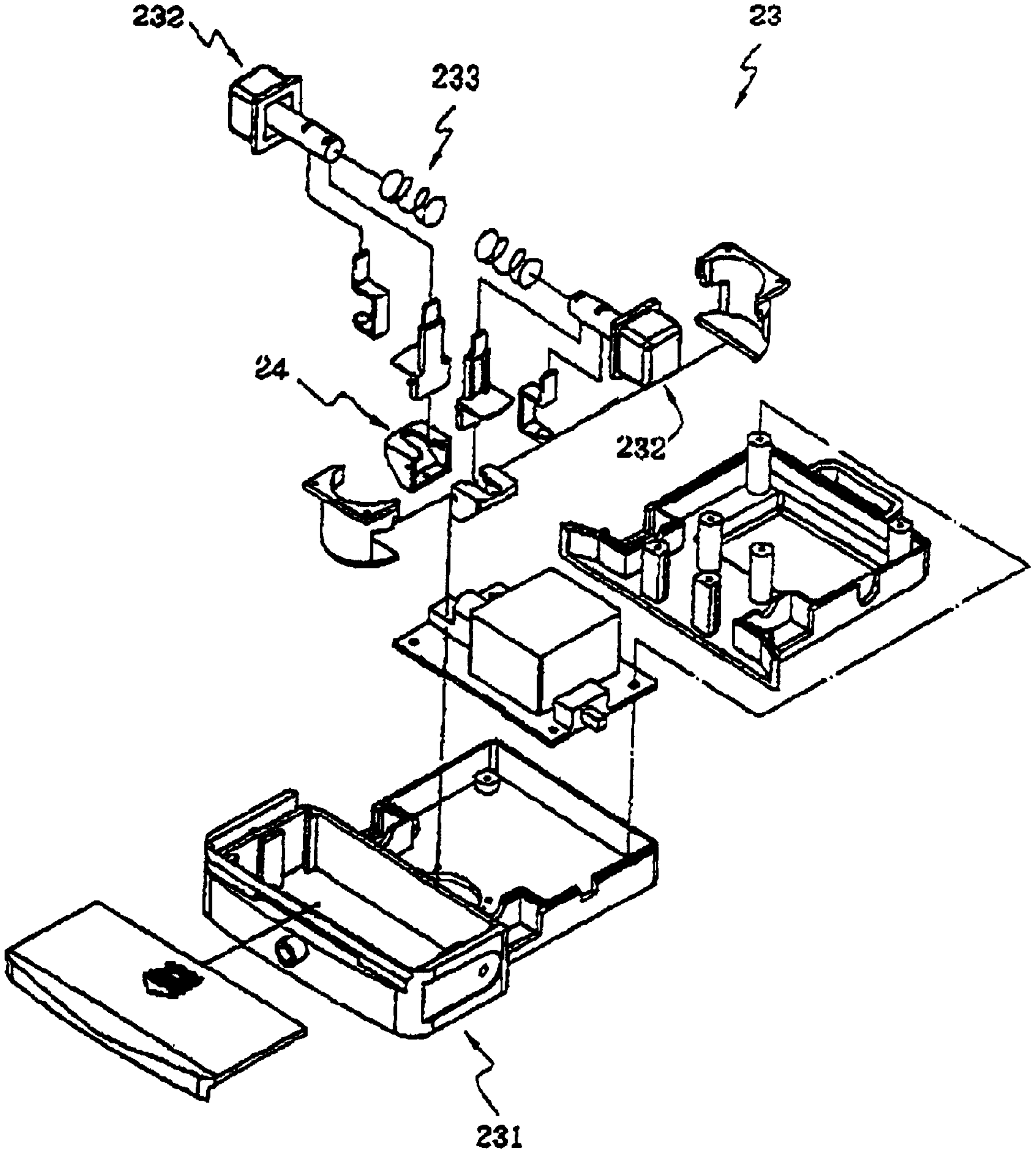
FIG. 4 shows an exploded view of the extending portion of the present invention.

FIG. 4 shows an exploded view of the extending portion 23 of the present invention. The buttons 232 mainly utilizes the elasticity of a spring 233 to make the touch portion 24 shrunk inwards or expanded outwards. Batteries could be placed in the battery box 231 for providing power source of the portable apparatus 20 for use with the light-emitting disk according to the present invention. The batteries could further connect to an inverter for transferring a DC voltage to an AC voltage and frequency. A typical voltage is about 60V to 150V, and a typical frequency is about 100 Hz to 5KHz.

Figure 5A:
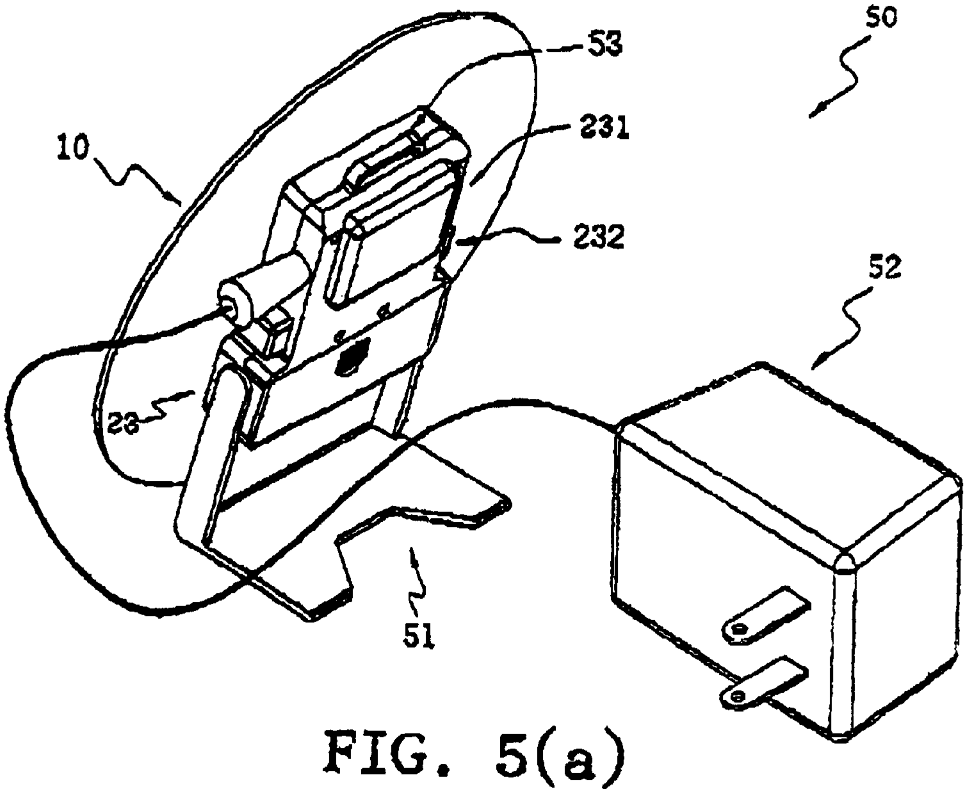
FIGS. 5(*a*) and 5(*b*) show a second embodiment of the portable apparatus for use with the light-emitting disk according to the present invention.
Figure 5B:
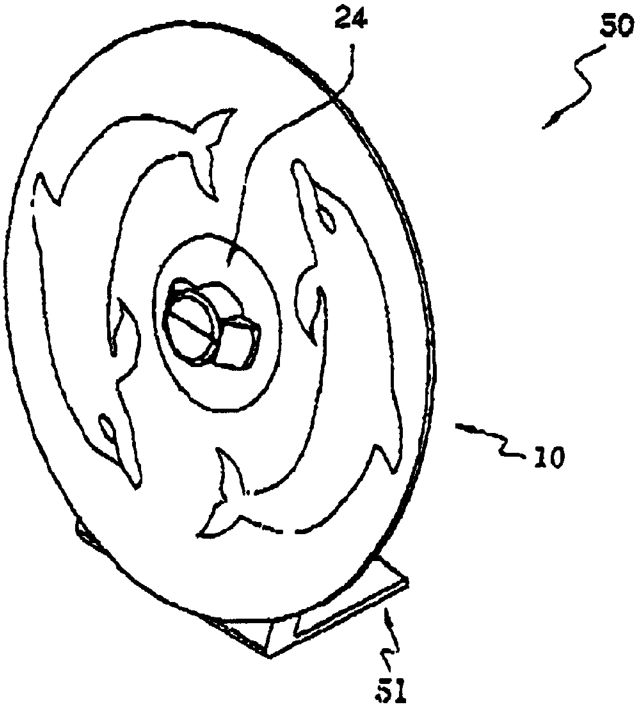
Figure 5C:
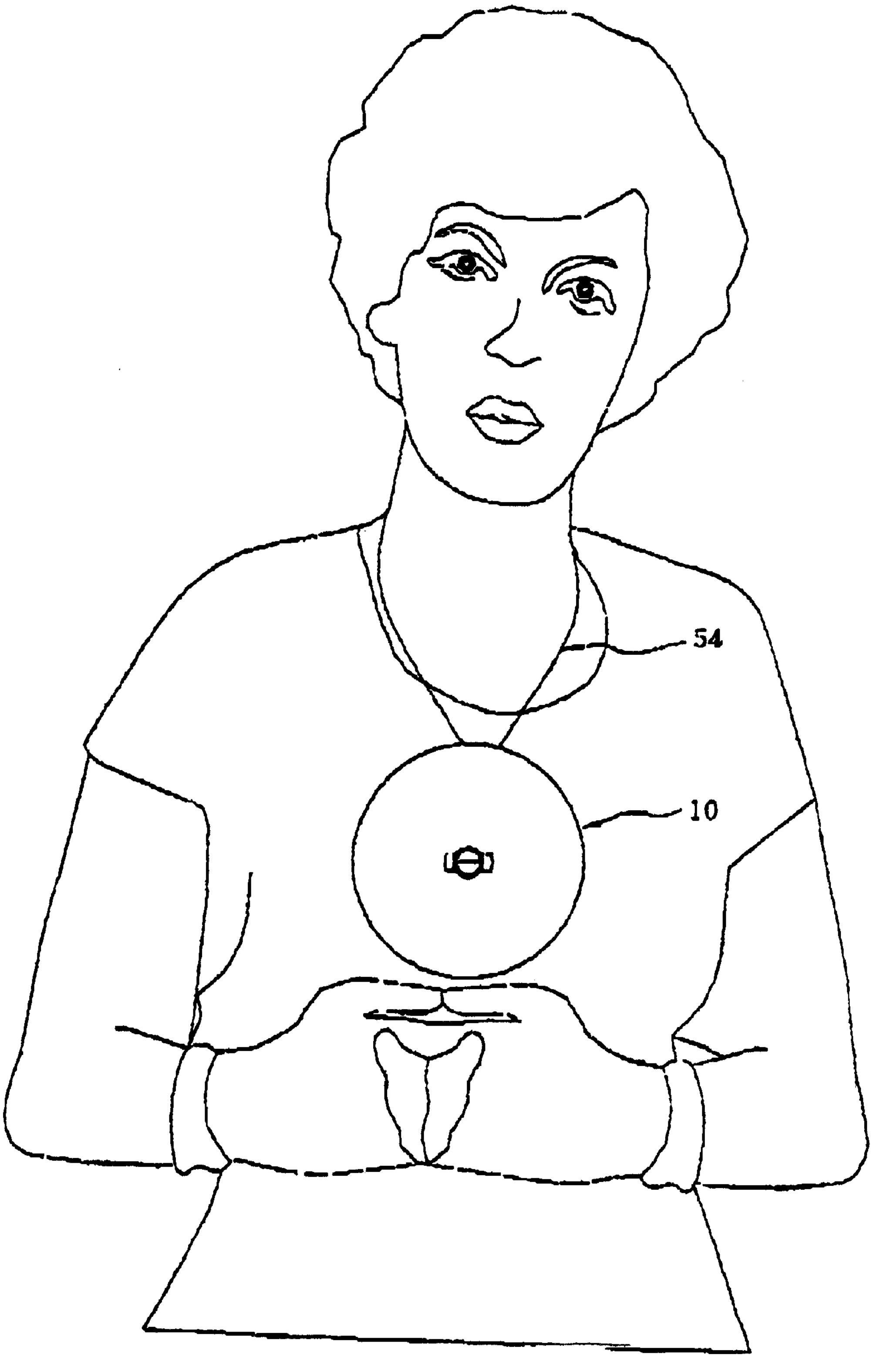

FIGS. 5(*a*) and 5(*b*) show a second embodiment of the portable apparatus for use with the light-emitting disk according to the present invention. The difference from the portable apparatus 20 in FIG. 2 is that the portable apparatus 50 in FIG. 5 does not use a hand-carrying portion 22, but connects the extending portion 23 to a base 51. The combination of the portable apparatus with the light-emitting disk can serve as means of storage for disks and provide apparatus 50 can use a plug 52 to plug into an indoor socket on the wall instead of using the battery.

In FIG. 5(*c*), a rope 54 passes through the hole 53 on the portable apparatus 50. A user can hand the portable apparatus 50 for use with the light-emitting disk on the chest or wind the portable apparatus 50 round her wrist. Besides, the sponsor of a partly, a singing show or a pub can previously record the singer's song on a light-emitting disk, combine the light-emitting disk 10 into a portable apparatus by the teaching of the present invention, and give as a present to viewers or draw lots to determine the prize winners for increasing a scene atmosphere or for advertising effect.

Figure 6:
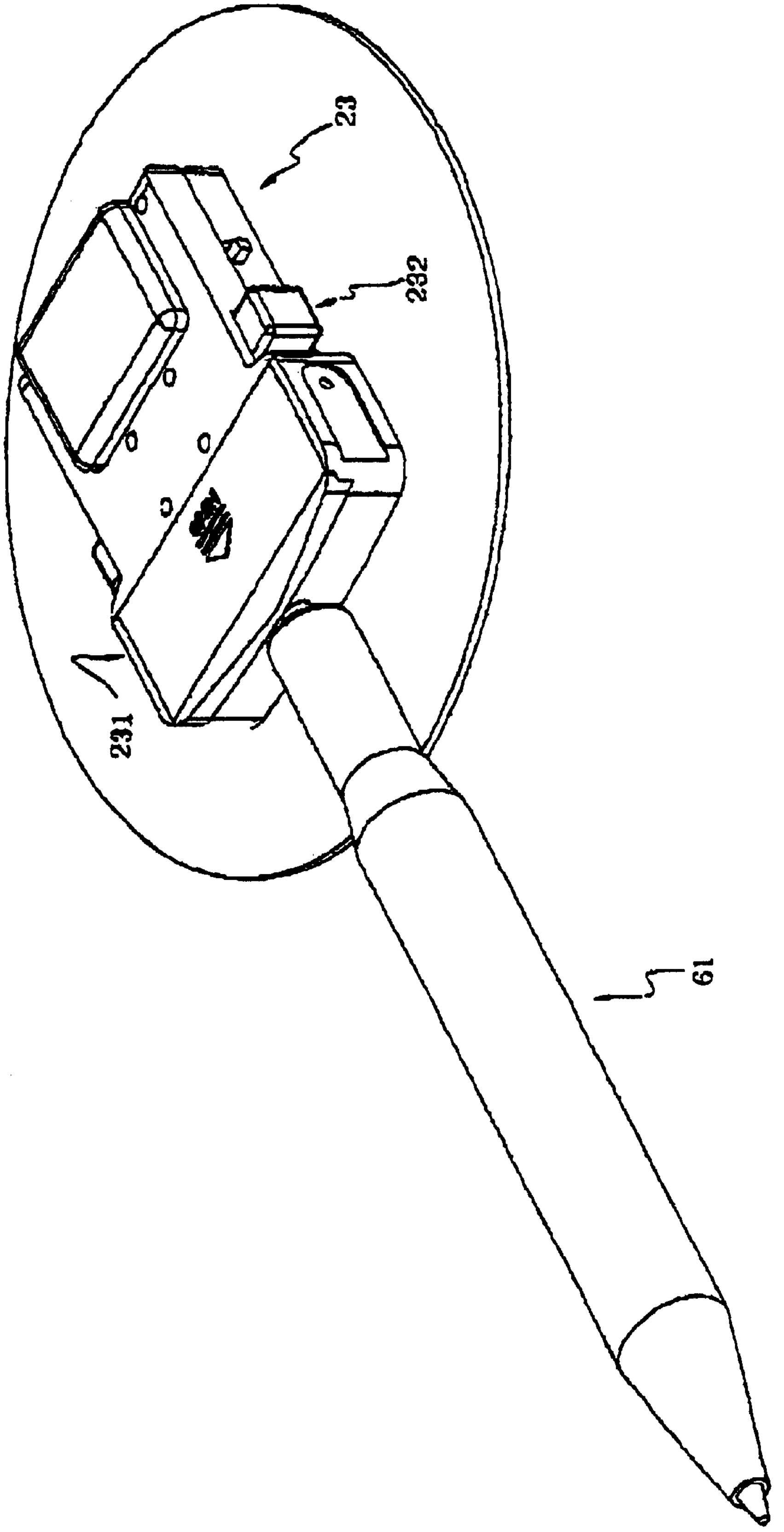
FIG. 6 shows a third embodiment of the portable apparatus for use with the light-emitting disk according to the present invention.

FIG. 6 shows a third embodiment of the portable apparatus for use with the light-emitting disk according to the present invention. In this embodiment, the hand-carrying portion 61 further adds a ball pen function to increase the valuation of the products.

Figure 7A:
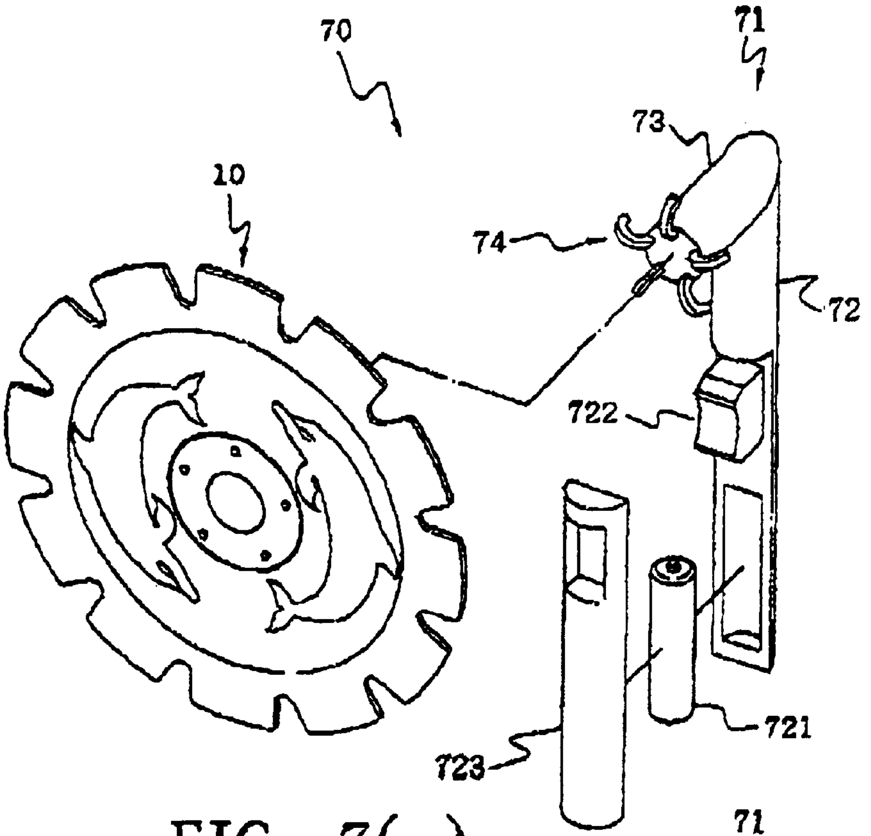
FIGS. 7(*a*) and 7(*b*) shoe exploded views of a fourth embodiment of the portable apparatus for use with the light-emitting disk according to the present invention.
Figure 7B:
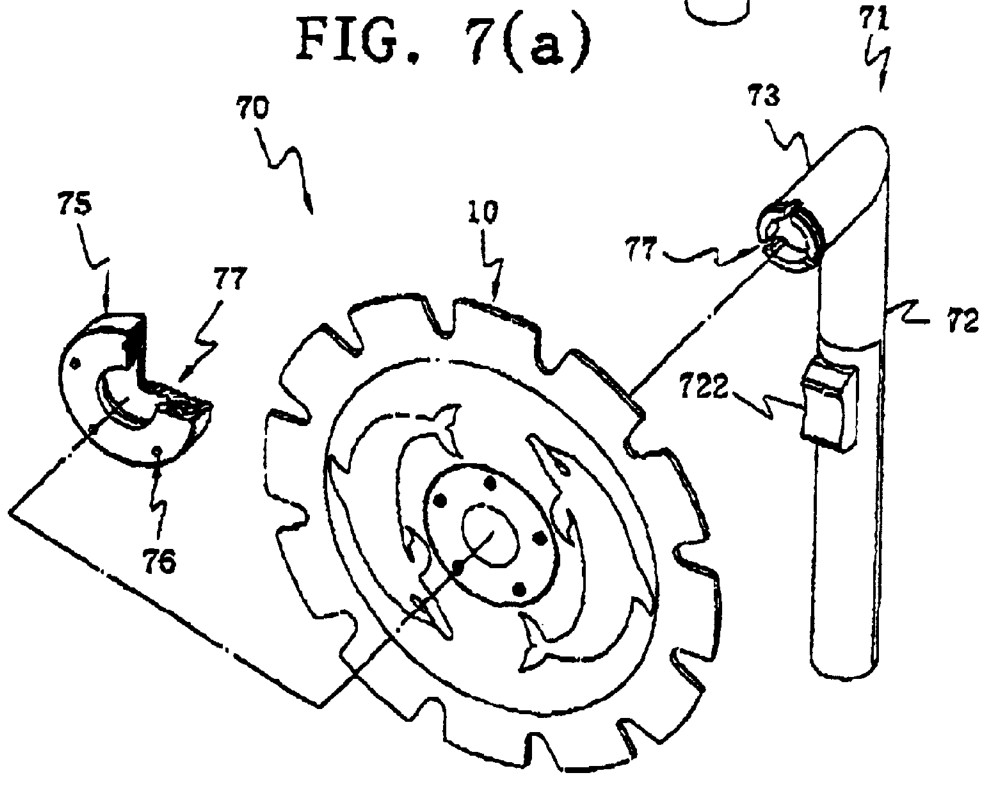

FIGS. 7(*a*) and 7(*b*) show the exploded views of the fourth embodiment. The portable apparatus 70 for use with the light-emitting disk mainly comprises a fastening mechanism 71 and a light-emitting disk 10, and the fastening mechanism 71 includes a hand-carrying portion 72, an extending portion 73 and a touch portion. The hand-carrying portion 72 can embed a battery 721 serving the power source of the portable apparatus 70, and further comprises a fixed button 722 pressed by users for controlling the timing of lighting the light-emitting disk 10, and a removable housing 723. Also, the fixed button 722 can be replaced with a shaking switch (not shown), and the light-emitting disk 10 will light when the portable apparatus 70 is shaken to conduct the button. The extending portion 73 extends from the top of the hand-carrying portion 72 for passing through the central hole of the light-emitting disk 10 and combining the fastening mechanism 71 and the light-emitting disk 10 tightly. The object of the touch portion is to transfer the power source of the battery 721 into the plurality of conductive terminals 13 of the light-emitting disk 10. Therefore, the design methodology of the touch portion is to consider how to combine tightly with the extending portion 73 and contact well with the conductive terminals 13. The touch portion shown in FIG. 7(*a*) includes concave metal shrapnels 74. After the extending portion 73 passes through the central hole of the light-emitting disk 10, the metal shrapnels 74 recover their original elasticity and contact the conductive terminals 13 to reach an electrical connection purpose. The touch portion shown in FIG. 7(*b*) is a tube-shaped mechanism 75 having a plurality of contacts 76 corresponding to the conductive terminals 76 on the surface contacting the light-emitting disk 10. The inner side of the tube-shaped mechanism 75 has dovetails 77, which combine the extending portion 73 tightly and make the contacts 76 electrically connect the conductive terminals 13 after the extending portion 73 passes through the central hole of the light-emitting disk 10. The fastening mechanism 71 shown in FIGS. 7(*a*) and 7(*b*) further comprises an electrically connecting mechanism (such as wires) to connect the battery 721 and the contact portion. In FIG. 7(*b*), the contacts 76 can electrically connect to the electrically connection mechanism through the dovetails 77 serving as a medium. Another design key of the portable apparatus 70 for use with the light-emitting disk is how the touch portion can firmly contact the conductive terminals 13. Of course, the user can slightly rotate the light-emitting disk 10 on the fastening mechanism 71 until the light-emitting disk 10 is lit up.

Figure 8A:
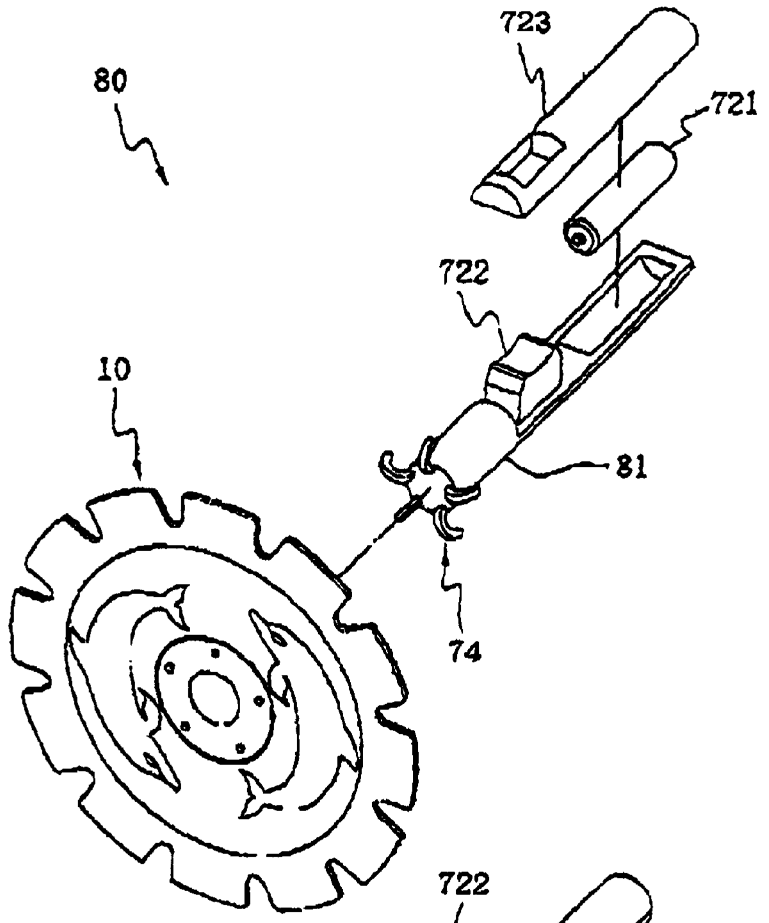
FIGS. 8(*a*) and 8(*b*) show exploded views of a fifth embodiment of the portable apparatus for use with the light-emitting disk according to the present invention.
Figure 8B:
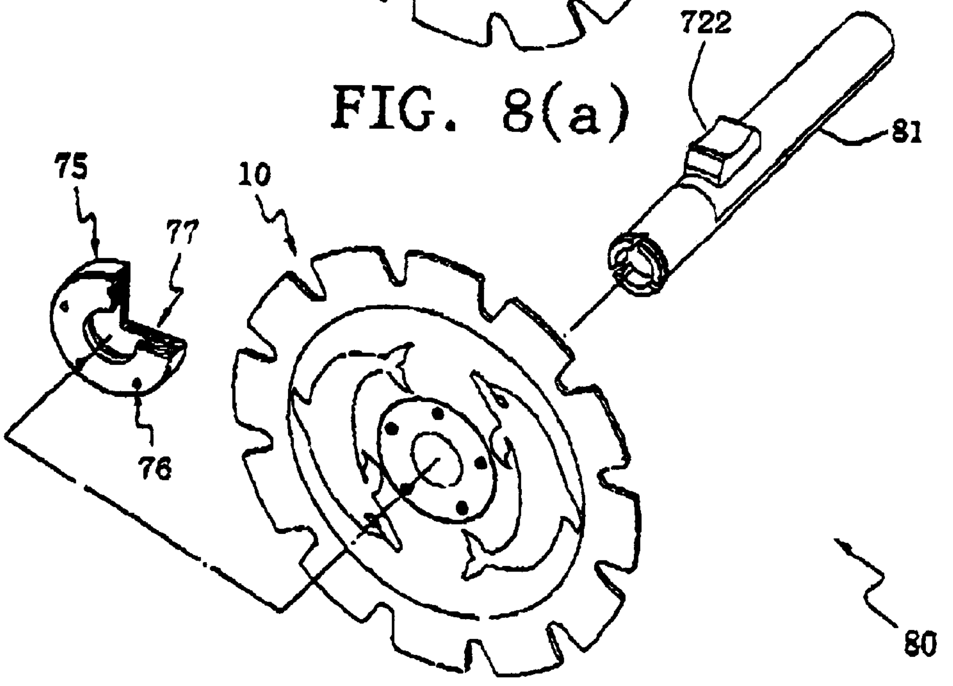

FIGS. 8(*a*) and 8(*b*) show exploded views of the fifth embodiment of the portable apparatus for use with the light-emitting disk according to the present invention. The portable apparatus 80 for use with the light-emitting disk omits the hand-carrying portion 72 shown in FIGS. 7(*a*) and 7(*b*), and locates the battery 721, button 722 and the removable housing 723 into the extending portion 81. The object of the design is to reduce the volume of the whole apparatus and to make it more portable.

Figure 9A:
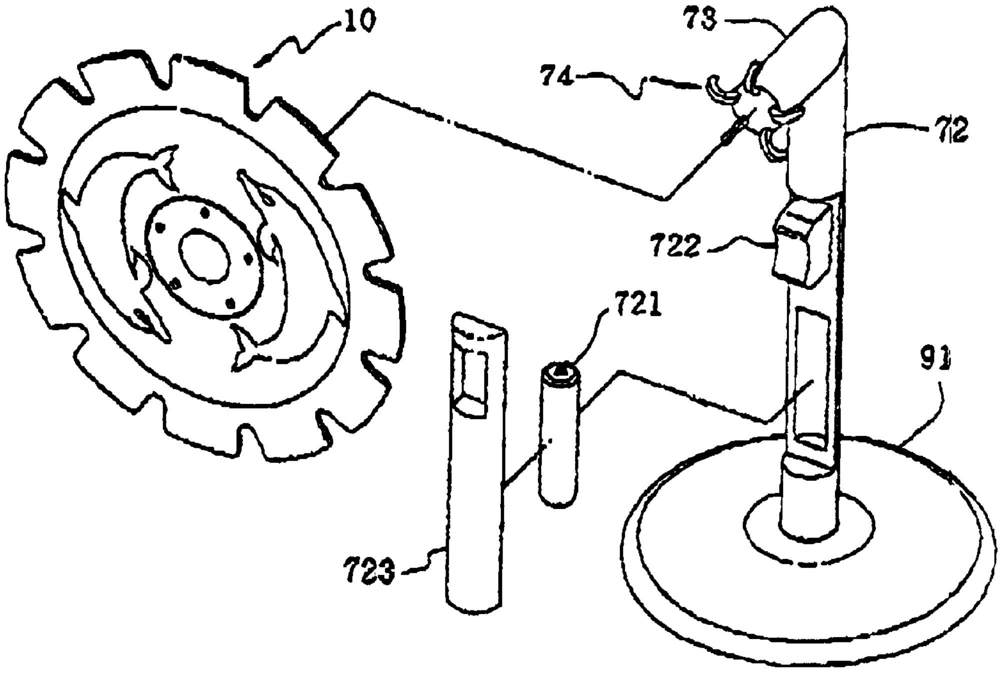
FIGS. 9(*a*) and 9(*b*) show an embodiment of combining the portable apparatus for use with the light-emitting disk shown in FIGS. 7(*a*) and 7(*b*) to a base.
Figure 9B:
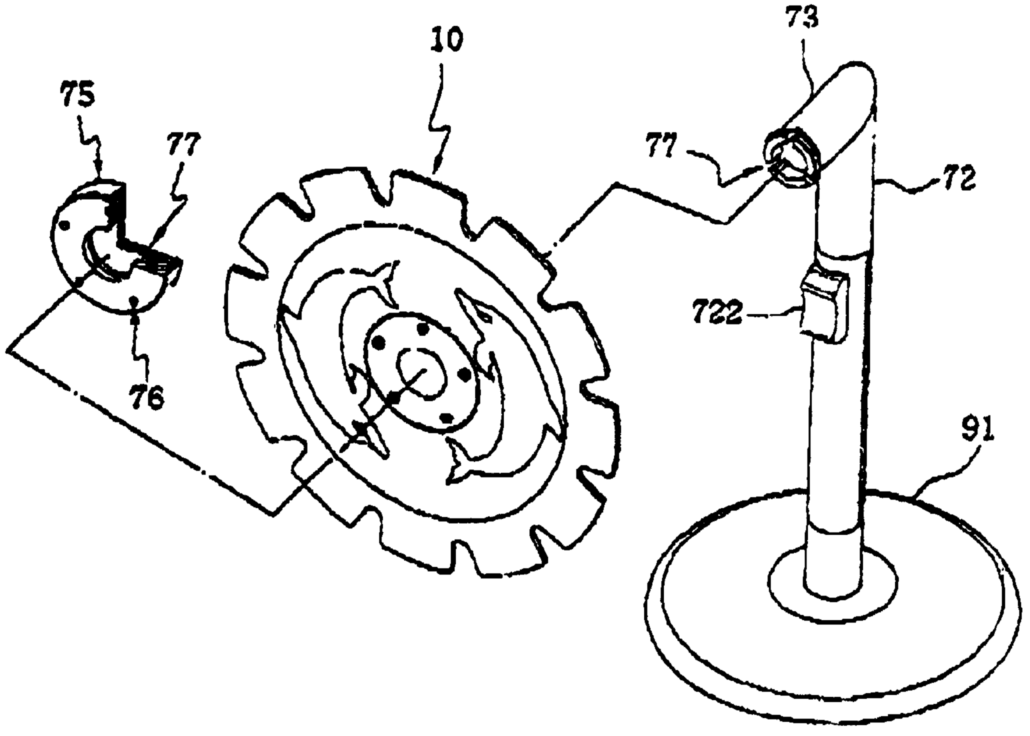

FIGS. 9(*a*) and 9(*b*) show an embodiment combining the portable apparatus for use with the light-emitting disk shown in FIGS. 7(*a*) and 7(*b*) to a base. The portable apparatus 70 for use with the light-emitting disk obtained from the party can be combined with a base 91 to act as a nightlight.

The above-described embodiments of the present invention are intended to be illustrative only. Numerous alternative embodiments may be devised by those skilled in the art without departing from the scope of the following claims.

What is claimed is:

1. A portable apparatus for use with a light-emitting disk, comprising:

a light-emitting disk including; a readable surface and a light-emitting surface, and a plurality of conductive terminals placed on an clamping area of the light-emitting surface; and a fastening mechanism including; an extending portion, a touch portion and a power source, the touch portion connected to the extending portion and used for transferring the power source to the conductive terminals to excite the light-emitting disk to luminesce.

2. The portable apparatus of claim 1, wherein the extending portion includes a button and the touch portion includes separate metal blocks, and a close level of the touch portion could be controlled by pressing the button.

3. The portable apparatus of claim 1, wherein the power source is placed in the extending portion, and is further connected to an inverter.

4. The portable apparatus of claim 1, further comprising a base connected to the extending portion.

5. The portable apparatus of claim 1, further comprising a hand-carrying portion connected to the extending portion.

6. The portable apparatus of claim 5, wherein the hand-carrying portion includes a writing mechanism.

7. The portable apparatus of claim 1, wherein the touch portion includes concave metal shrapnels.

8. The portable apparatus of claim 1, wherein the touch portion is a tube-shaped mechanism whose surface has contacts.

9. The portable apparatus of claim 1, wherein the light-emitting disk is placed between the touch portion and the extending portion, and the touch portion and the extending portion are combined with dovetails.

10. The portable apparatus of claim 1, wherein the fastening mechanism further comprises a hole passed by a rope.

11. The portable apparatus of claim 1, wherein a front sheet is placed on the light-emitting surface for showing special patterns.

12. The portable apparatus of claim 1, further comprising a base connected to the hand-carrying portion.

13. The portable apparatus of claim 1, further comprising a shaking switch to turn on the power source.

14. The portable apparatus of claim 1, further comprising a fixed button to turn on the power source.

15. The portable apparatus of claim 1, wherein the light-emitting disk lights partially, intermittently, or with different colors by applying electricity to the plurality of conductive terminals.

* * * * *